Patented Nov. 28, 1922.

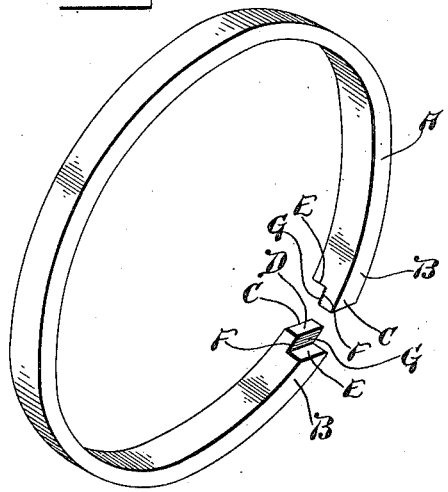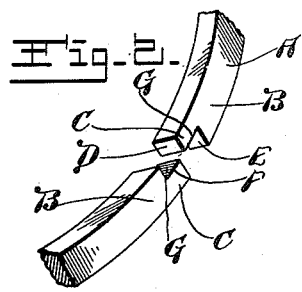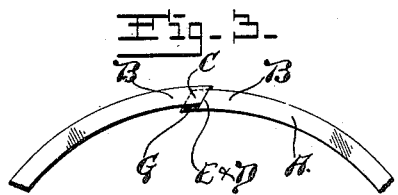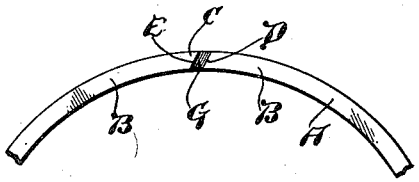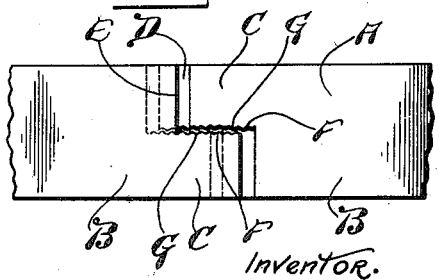

1,436,774

UNITED STATES PATENT OFFICE.

ARDEN J. MUMMERT, OF UNIVERSITY CITY, MISSOURI, ASSIGNOR TO McQUAY-NORRIS MANUFACTURING COMPANY, OF ST. LOUIS, MISSOURI, A COMMON LAW TRUST.

PISTON RING.

Application filed April 9, 1921. Serial No. 459,975.

*To all whom it may concern:*

Be it known that I, ARDEN J. MUMMERT, a citizen of the United States, residing in University City, in the county of St. Louis and State of Missouri, have invented a new and useful Improvement in Piston Rings, of which the following is a full, clear, and exact specification, reference being had to the accompanying drawings, which form a part thereof.

My invention relates to metallic piston rings and especially to one-piece split resilient rings of small diameter, such as are used in automobile motors.

The objects of my invention are to provide in a piston ring a scarf joint with overlapping parts which will effectually prevent leakage at the meeting of the overlapping parts of the joint; to provide means whereby this joint, as the ring expands or contracts with the movement of the piston along the walls of the cylinder, will be adapted to a wear fit, that is to say the oppositely disposed lateral faces of the overlapping parts of the joint will be so formed that the expansion and contraction resulting from use of the ring wear said faces to bearing surfaces; to provide a ring so formed that as it expands from use and wear the separation of the transverse walls of the overlapping parts of the ends at the split joint in the ring will be minimized, thereby preventing excessive leakage at said joint; and to provide a ring which will decrease leakage as the ring wears in use, thereby increasing compression and assuring more economical and efficient operation of a motor wherein the ring is used.

My invention is clearly shown in the accompanying drawings where similar letters are used to designate similar parts. Fig. 1 is a one-piece split resilient ring embodying my invention; Fig. 2 is a section of the ring in Fig. 1, showing the scarf joint in said ring with the overlapping parts; Fig. 3 is a peripheral view of a section of the ring showing the joint in the ring when the ring is contracted and one end of the ring is forced slightly outwardly by the formation of the transverse walls of the overlapping parts; Fig. 4 is a peripheral view of a section of the piston ring showing the joint in said ring after the ring is expanded slightly following wear and the conformation of the ring to the walls of the cylinder; and Fig. 5 is an enlarged face view of the ring showing in detail the striations formed on the oppositely disposed lateral faces of the overlapping parts of the joint.

Referring to the figures, A is a split resilient ring of substantially the same thickness throughout, having the ends B formed with the overlapping parts C adapted to meet in a scarf joint and overlap on a plane substantially at right angles with the axis of said ring. The overlapping parts C have the transverse faces D with the transverse faces E oppositely disposed thereto and also oppositely disposed lateral faces F which come in contact as the joint is closed. The transverse faces D and E are formed at the same angle oblique to the periphery of the ring A and lie in parallel planes. The lateral faces F have formed thereon a plurality of striations G which are reduced to a wear fit as the lateral faces F move upon one another with the use of the ring.

As the piston with which the ring is used moves within the cylinder walls, the ring, which is in contact with the walls, undergoes a resulting expansion and contraction in conformation to the irregularities in the cylinder wall. This expansion and contraction causes the striations G on the lateral faces F to be rubbed over and against the striations on the oppositely disposed lateral face. This rubbing causes the striations on each lateral face F to be reduced and changed to conform to the particular irregularities of the oppositely disposed face thereby producing a wear fit which effectually assists in preventing the leakage or passage of gas or oil between the two lateral faces F. The striations G are clearly shown in the enlarged face view of the scarf joint in Fig. 5 of the accompanying drawings.

The striations as shown in the drawings are preferably formed parallel with the transverse faces E on the ends B of the ring A. When so formed they more quickly adapt themselves to a wear fit since the expansion and contraction of the ring A due to the movement on the piston rubs the striations on one face F laterally over the striations on the oppositely disposed lateral face. While this is the most advantageous formation of the striations, I do not propose to limit myself to striations which are parallel with the transverse face E.

Since the transverse faces D and E on the overlapping parts C are formed at an angle oblique to the periphery of the ring and lie in parallel planes, the movement or separation of said faces when the ring expands will be less than the expansion peripherally of the ring A. This minimization of the separation of the oppositely disposed transverse faces D and E of the scarf joint effects a corresponding minimization of the width of the path between the transverse faces through which gas or oil may pass.

When the resilient rings are new and have not been worn into conformation with the cylinder walls, the transverse faces D on the overlapping parts C, and the transverse faces E, oppositely disposed thereto, may be brought in contact, in which case the pressure of the cylinder walls on the face of the ring may cause one end of the ring at the scarf joint to be forced slightly inwardly, the transverse faces riding one upon the other as shown in Fig. 3 of the drawings; but as the ring wears to conform to the cylinder walls there is a resulting peripheral expansion of the ring, and the transverse faces D and E become separated. This construction allows the ring to be exceptionally tight when installed. This initial tightness assures a snug fit and a lessening of separation of the transverse faces D and E of the scarf joint as the ring wears in use.

What I claim as new and desire to secure by Letters Patent, is:

1. A piston ring having the ends thereof provided with overlapping parts adapted to form a scarf joint and having striations on the oppositely disposed lateral faces of said overlapping parts arranged so that when said ring is expanded or contracted the striations on one of said lateral faces cannot move lengthwise along the striations on said lateral face oppositely disposed thereto.

2. A one-piece piston ring having the ends thereof provided with overlapping parts adapted to form a scarf joint and having a plurality of parallel striations on the oppositely disposed lateral faces of said overlapping parts arranged so that when said ring is expanded or contracted the striations on one of said lateral faces cannot move lengthwise along the striations on said lateral face oppositely disposed thereto.

3. A piston ring having the ends thereof provided with overlapping parts adapted to form a scarf joint, said ends having the transverse face of each overlapping part and the face oppositely disposed thereto formed at the same angle oblique to the periphery of said ring, and striations on the oppositely disposed lateral faces of said overlapping parts arranged so that when said ring is expanded or contracted the striations on one of said lateral faces cannot move lengthwise along the striations on said lateral face oppositely disposed thereto.

4. A piston ring having the ends thereof provided with overlapping parts adapted to form a scarf joint, said ends having the four transverse faces thereof formed at the same angle oblique to the periphery of said ring and lying in parallel planes and having striations on the oppositely disposed lateral faces of said overlapping parts arranged parallel to said transverse faces.

5. A piston ring having the ends thereof provided with overlapping parts adapted to form a scarf joint, said ends having the four transverse faces thereof formed at the same angle oblique to the periphery of said ring and lying in parallel planes and having parallel striations on the oppositely disposed lateral faces of said overlapping parts arranged so that when said ring is expanded or contracted the striations on one of said lateral faces cannot move lengthwise along the striations on said face oppositely disposed thereto.

In witness whereof I have signed my name to this specification.

ARDEN J. MUMMERT.